United States Patent
Kuno et al.

(10) Patent No.: US 8,799,901 B2
(45) Date of Patent: Aug. 5, 2014

(54) ESTABLISHING NEW SERVICE AS CONVERSATION BY REPLACING VARIABLES IN GENERIC SERVICE IN AN ORDER WITH VARIABLES FROM A DECOUPLED METHOD OF LEGACY SERVICE

(75) Inventors: Harumi Kuno, Cupertino, CA (US);
Alan Hersh Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2328 days.

(21) Appl. No.: 10/850,131

(22) Filed: May 20, 2004

(65) Prior Publication Data
US 2005/0261920 A1 Nov. 24, 2005

(51) Int. Cl.
*G06F 9/46* (2006.01)
*G06F 9/44* (2006.01)
*G06F 15/173* (2006.01)

(52) U.S. Cl.
USPC ........... 718/100; 717/102; 717/103; 719/312; 719/313; 709/223

(58) Field of Classification Search
USPC .............. 718/1, 100, 101, 106; 719/311, 312, 719/313, 314, 316, 318, 319; 717/100, 101, 717/102, 103, 120, 168, 169, 170, 172
See application file for complete search history.

(56) References Cited

U.S. PATENT DOCUMENTS

| | | | |
|---|---|---|---|
| 5,752,246 A | 5/1998 | Rogers et al. | 707/10 |
| 6,205,466 B1 | 3/2001 | Karp et al. | 718/104 |
| 6,304,906 B1 | 10/2001 | Bhatti et al. | 709/227 |
| 6,336,138 B1 * | 1/2002 | Caswell et al. | 709/223 |
| 6,550,057 B1 * | 4/2003 | Bowman-Amuah | 717/126 |
| 7,194,756 B2 * | 3/2007 | Addington et al. | 725/116 |
| 7,349,980 B1 * | 3/2008 | Darugar et al. | 709/238 |
| 7,509,648 B1 * | 3/2009 | Afshar et al. | 719/310 |
| 2002/0138427 A1 * | 9/2002 | Trivedi | 705/40 |
| 2002/0194323 A1 * | 12/2002 | Chantrain et al. | 709/223 |
| 2003/0083910 A1 * | 5/2003 | Sayal et al. | 705/7 |
| 2003/0154154 A1 * | 8/2003 | Sayal et al. | 705/37 |
| 2003/0229884 A1 * | 12/2003 | Carr et al. | 717/101 |
| 2004/0025157 A1 * | 2/2004 | Blight et al. | 717/174 |
| 2004/0034540 A1 * | 2/2004 | Chen et al. | 705/1 |
| 2004/0103389 A1 * | 5/2004 | Song et al. | 717/107 |
| 2004/0205129 A1 * | 10/2004 | Bongiorni et al. | 709/204 |
| 2004/0260798 A1 * | 12/2004 | Addington et al. | 709/223 |
| 2005/0120342 A1 * | 6/2005 | Saracco et al. | 717/162 |
| 2005/0166187 A1 * | 7/2005 | Das et al. | 717/136 |

OTHER PUBLICATIONS

Lee Gavin, Gangadhara Rao Akana, Axel Angeli, Sreedhar Reddy Bhumireddy, Peter Gersak, Nizam Ishmael, Hari Kumar Nagumalla, Viral Ved;A B2B Solution using WebSphere Business Integration V4.1 and WebSphere Business Connection V1.1; Aug. 2003; IBM Redbooks.*

Marin Litoiu; Migrating to Web Services—Latency and Scalability; Proceedings of the Fourth International Workshop on Web Site Evolution, 2002 IEEE; pp. 1-8.*

* cited by examiner

*Primary Examiner* — Abdullah Al Kawsar

(57) ABSTRACT

Methods associated with a service are identified. Select ones of the methods are matched to generic methods of a conversation. A new service is established from the conversation that includes the select ones of the methods.

10 Claims, 4 Drawing Sheets

ESTABLISHING NEW SERVICE AS CONVERSATION BY REPLACING VARIABLES IN GENERIC SERVICE IN AN ORDER WITH VARIABLES FROM A DECOUPLED METHOD OF LEGACY SERVICE

BACKGROUND OF THE INVENTION

Enterprises are increasingly offering services to consumers and partners over the Internet. These services are generally embodied as one or more applications that interact with consumers or other services via World-Wide Web (WWW) browsers over the Internet. The applications that comprise a service are integrated with one another and define the available processing flows associated with a particular service. That is, each web service is defined rigidly by specific interactions of coupled applications that are integrated with one another.

As a result, new services cannot be easily and efficiently developed. This is so, because each of the applications typically includes processing logic for interacting with another one of the applications. Thus, if a new service is desired which includes only a select number of applications that make up a legacy service, then, in order to create the new service, new instances of desired applications are created. This is so, because the other applications are too integrated and too dependent (coupled) upon the processing flow associated with the legacy service. Moreover, even if components of applications are reused, a substantial amount of new code is still developed to account for new processing flows associated with a newly desired service.

DETAILED DESCRIPTION OF THE INVENTION

Figure 1:
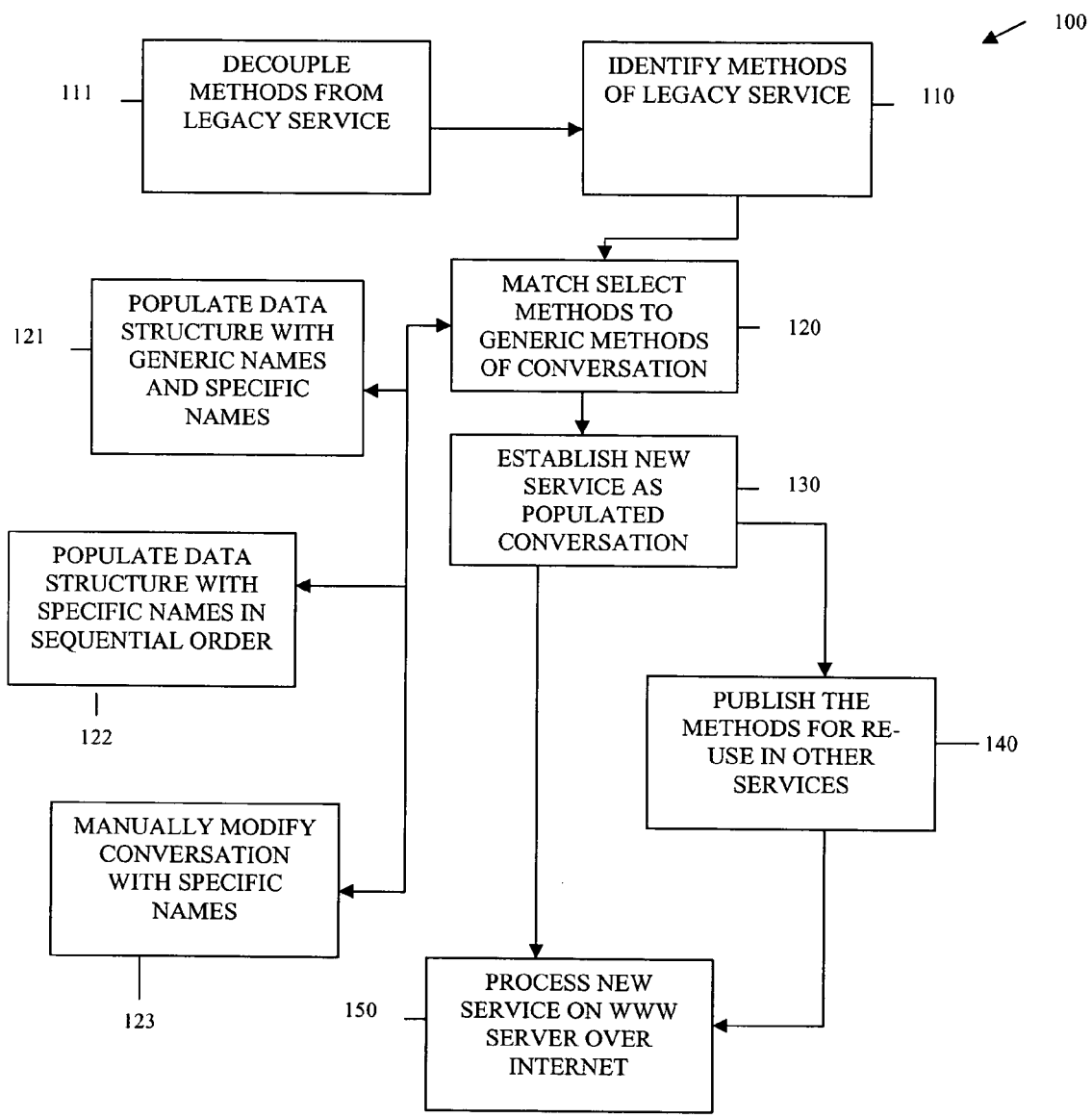
FIG. 1 is a diagram of a method for establishing a service, according to an embodiment of the invention.

FIG. 1 is a diagram for one method 100 to establish a service. The method 100 is implemented in a machine-readable or accessible medium. In one embodiment, the method 100 (hereinafter "processing") represents one or more applications or a single system that cooperates to derive and establish a new service from an existing service or legacy service. A legacy service is one that pre-exists and performs one or more functions or operations. The new service is available over a network, that network can be hardwired, wireless, or a combination of hardwired and wireless. In one embodiment, the new service is available to users, applications, and other services over the Internet, such as through interactions with a WWW browser or applets associated as plug-ins to a WWW browser.

A service as used herein refers to a substantially unique set of methods (e.g., operations, commands, etc.) that cooperate in a defined manner to produce results. A service can be interacted with manually or in an automated fashion. That is, a user, another different service, or an automated application can interact with a service. For example, a service can be an electronic storefront for an enterprise; can be an electronic auctioning service, and the like.

A conversation is a script-type data structure that assembles methods and defines a processing order for a service. Thus, in some ways, a specific instance of a conversation is a specific service. Conversations can be generically defined or populated with specific methods to define a specific service. A generic conversation is a template for establishing one or more specific instances of services (or specific instances of conversations).

Initially, the applications associated with a legacy service are evaluated for independent processing operations referred to as methods. For example, one method might be to add a product to an electronic shopping cart or to checkout and pay for the product. Thus, at 110, the methods of a legacy service are identified. In some embodiments, this may entail actively decoupling operations from existing legacy applications, as is depicted at 111. It should also be noted that the methods identified do not have to all originate from the same service. This means that a set of available methods, which can be independently processed, can each be associated with different legacy services or legacy applications.

At 120, select ones of the identified methods are matched to generic methods included within a generic conversation. The identified methods have substantially unique names or substantially unique reference labels, which identify them for invocation by a program of a specific instance of the generic conversation. The generic conversation also includes generic names or reference labels for generic methods. So, at 120, the names for select ones of the identified methods are matched to appropriate generic names included in the generic conversation.

One technique for achieving the matching of specific method names to generic method names included in the generic conversation is depicted at 121. Here, a mapping data structure lists the generic method names along with their corresponding replacement specific method names associated with the identified methods. This can be achieved with a tagging arrangement, such that substantially unique tags match pairs of generic method names to specific method names. Alternatively, matching within the data structure can be based on fixed fields or records, such that each substantially unique generic name is associated with a specific name.

In another technique, at 122, the specific method names can be ordered in a sequential fashion within a mapping data structure with no indication as to the generic method names. In this embodiment, the specific method names are inserted in sequential order into the generic conversation based on the order of encountered generic method names included in the generic conversation. When a generic name is encountered in the generic conversation, a specific method name is acquired from the mapping data structure.

In still another hybrid embodiment, the specific method names can be ordered in a sequential fashion and include an integer iteration number, such that a specific method name can be replaced sequentially in a generic conversation for more than a single iteration. This would substantially prevent duplicating repetitive entries in the mapping data structure which occur one after another.

In yet another embodiment, a developer or user may load the generic conversation into an editor and manually replace generic method names with specific method names. Alternatively, a graphical user interface (GUI) application can display a listing of specific method names for a user along with descriptions for understanding the inputs, outputs, and features of the specific methods and the GUI application can display in context the generic method names of the generic conversation. The user manually interacts with the GUI application to select specific method names and to replace identified generic method names included within the generic conversation.

Once specific method names replace the generic method names of the generic conversation, a new specific instance of the generic conversation is established. This version of the conversation now includes processing flow and interaction logic between invocation calls to specific methods.

Thus, at 130, a new service is established as a specific instance of the original generic conversation. The new service can be processed and interacted with by users, clients, other services, and other applications. In one embodiment, the new service is published at 140 with a registration service that broadcasts its new availability to potential consuming users, clients, other services, and applications. Also, in one embodiment, the new service is hosted on a WWW server and is available over the Internet via any WWW browser. In this embodiment, the new service processes as an applet that can be called and executed from within the WWW browser.

The techniques presented above with method 100 demonstrate how services can be established from independent methods. These methods can be decoupled from legacy service, can be decoupled from a plurality of legacy service, or can be newly created and developed methods that are capable of being independently processed from any particular service. A generic conversation defines the processing flow and interaction between the methods and is used to created modular instances of services.

A single generic conversation can be used to derive multiple instances of a service. Thus, enterprises can now establish services in more efficient, timely, and re-usable manners than what has been conventionally achievable. Furthermore, enterprises can now collaborate better between one another by sharing methods to form new dynamic services as joint ventures. Thus, if one enterprise wants to permit credit card purchasing in its storefront, this is easily achieved with a conversation that includes methods of a credit card partner in addition to existing methods associated with the enterprise's storefront.

Figure 2:
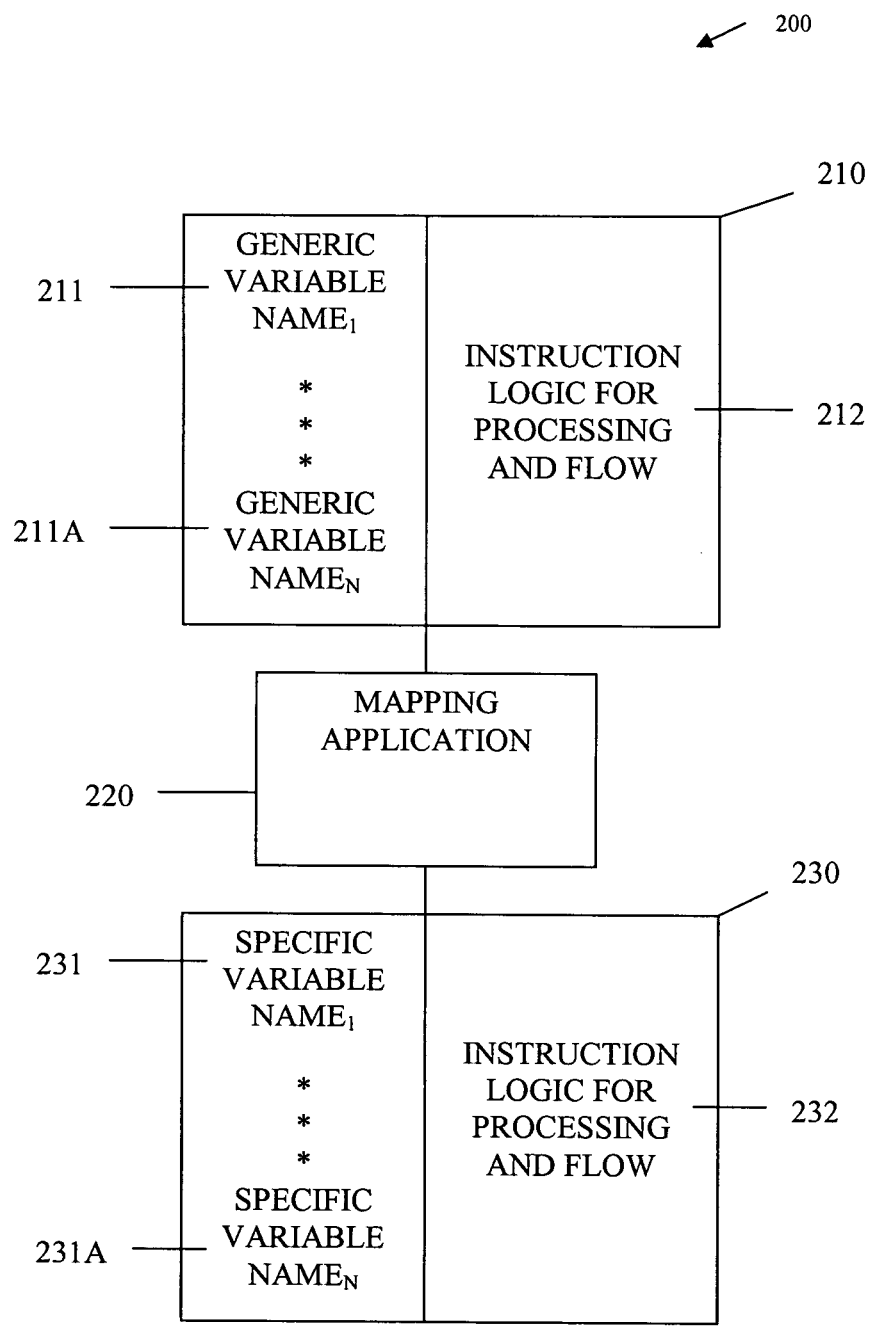
FIG. 2 is a diagram of a generic service data structure, according to an embodiment of the invention.

FIG. 2 is a diagram of one generic service data structure 200. The generic service data structure is referred to as a generic conversation and is implemented in a machine-accessible and readable medium. The generic conversation when populated produces a specific instance of a service. The service is accessible over any network or combinations of networks and, in one embodiment, is available on a WWW site for interaction with users, other services, clients, and applications.

FIG. 2 depicts the generic conversation in two states 210 and 230. In the first state 210, the generic conversation includes generic variable names 211 and 211A and instruction logic 212. In the second state 220, the conversation depicts a specific service which can be processed and includes specific variable names 231 and 231A and instruction logic 232. In both states 210 and 230, the instruction logic 212 and 232 are the same or remain consistent between the two states 210 and 230. The differences in the states 210 and 230 are reflected in the assignment of specific variable names 231 and 231A to the original generic variable names 211 and 211A.

The generic variable names 211 and 211A are placeholders in the generic conversation, such that when these variable names 211 and 211A are replaced with specific variable names 231 and 231A, a specific service is established. The generic variable names 211 and 211A refer to or reference generic methods. The specific variable names 231 and 231A refer to or reference specific methods. The specific methods can be decoupled from one or more legacy services. Alternatively, the specific methods can be custom developed to be independent of any particular service but can be combined with other methods to form services.

The instruction logic 212 or 232 represents executable or processing logic that defines the invocation of methods and interaction of the methods (processing flow) defined in the generic conversation. In some embodiments, the instruction logic 212 or 232 is a script that can be interpreted and directly executed on a processing device. In other embodiments, the instruction logic 212 or 232 can be compiled and/or linked in order to produce an executable form of the instruction logic 212 or 232 which can then be loaded and executed on a processing device.

The generic conversation initially appears in a generic form 210 having the generic variable names 211 and 211A which identify generic methods of a generic service. Once the generic conversation is populated with specific variable names 231 and 231A, the generic conversation transforms into a specific service 230.

One manner to achieve the transformation from 210 to 230 is via an intermediate mapping application 220. The mapping application 220 populates the generic conversation with the appropriate specific variable names 231 and 231A by removing the generic variable names 211 and 211A from the generic conversation. In some instances, this mapping application 220 can consume a second data structure (mapping data structure) that defines and identifies the appropriate replacement actions which are to be taken in the generic conversation. In other embodiments, the mapping application 220 is a GUI application that interacts with a user to receive the proper replacements. In still more embodiments, the mapping application 220 is an automated application that dynamically consumes configuration data or other files to automatically perform the proper replacements in the generic conversation.

In some instances the generic conversation can be populated in a plurality of iterations to produce multiple additional instances of services 230. Additionally, in one embodiment, the specifically created service 230 can be published with a registration service over the Internet, such that the new service 230 can be communicated to consuming users, clients, applications, and other services.

Figure 3:
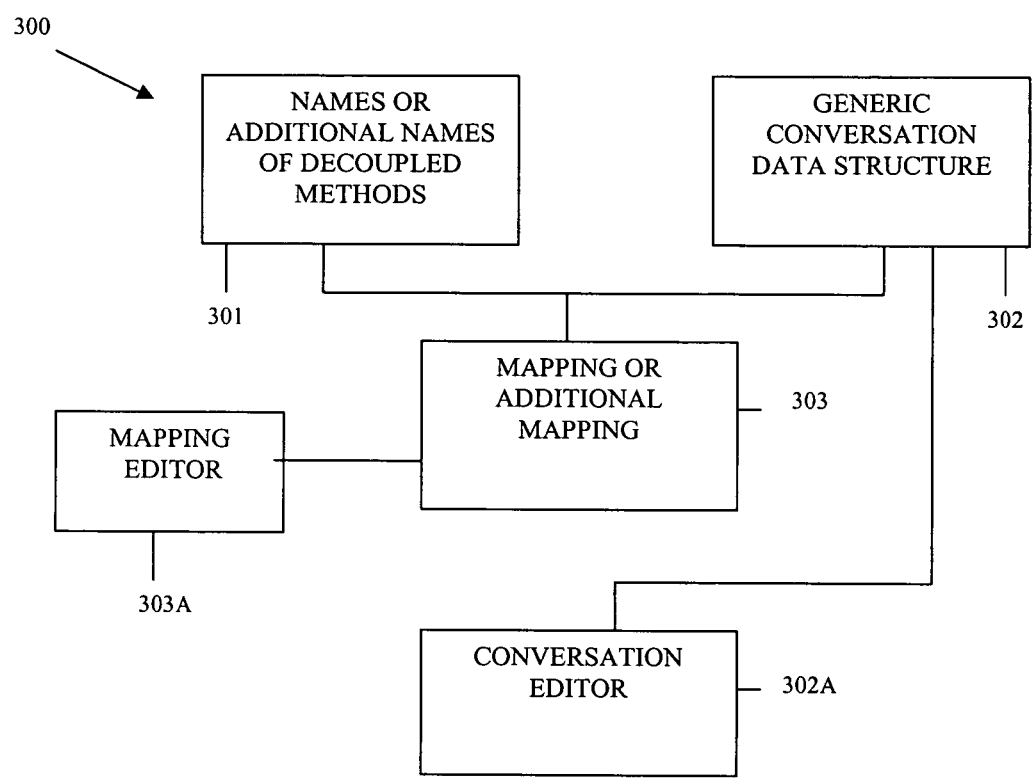
FIG. 3 is a diagram of a service establishment system, according to an embodiment of the invention.

FIG. 3 is a diagram of one service establishment system 300. The service establishment system 300 is implemented in a machine-accessible and computer readable medium. Moreover, the service establishment system 300 is accessible over a network or any combination of networks interfaced together. In one embodiment, the service establishment system 300 performs a portion of the processing defined above with method 100 of FIG. 1, and consumes and generates the generic service data structure 200 of FIG. 2.

The service establishment system 300 includes names of decoupled methods 301, a generic conversation data structure 302, and a mapping 303. The decoupled methods are methods that can be processed independent of any other methods or predefined processing. That is, a decoupled method can process with zero or more input parameters and produces zero or more output. In some embodiments, the decoupled methods are methods that were previously associated with a legacy service in which the applications of that service were tightly intertwined or integrated with one another and the decoupled methods were extracted there from to produce independent operations that are not dependent on the other applications in order to be processed. In some cases, the decoupled methods are associated with multiple disparate legacy services, or combinations of previous legacy services and new services.

The generic conversation data structure 302 is similar to the generic service data structure 200 described in detail above with respect to FIG. 2. Accordingly, the generic conversation data structure 302 is a script or main driving application that controls the processing flow of methods and their interactions; however, the methods of the generic conversation data structure 302 are generic methods having generic names or references associated therewith. In some embodiments, the generic conversation data structure 302 can be automatically created via interactions with a user or developer via a conversation editor 302A. In other embodiments, the generic conversation data structure 302 is not a script but, rather is processed as or by a state machine.

The mapping 303 identifies the replacements for the generic method and their corresponding specific names 301 associated with the decoupled methods. In some embodiments, the mapping can be automatically performed and/or defined by a mapping editor 303A.

During operation of the service establishment system 300, an initial generic conversation data structure 302 for a defined service is acquired or established. A listing of names for decoupled methods 301 are also acquired or established. Next, the mapping 303 is acquired or established. The mapping 303 is enforced against the generic conversation data structure 302 and the list of names for the decoupled methods 301 to produce a new specific service. That new service can then be loaded and executed on a processing device (e.g., server or client) over a network and made available for interactions with users, clients, other services, and applications.

It should also be noted, that in some embodiments the same generic conversation data structure 302 can be used with additional names of decoupled methods 301 and an additional mapping 303 to produce additional instances of specific services. Thus, a single generic conversation data structure 302 representing a generic service can be re-used to produce multiple instances of a same service. Moreover, the decoupled methods are not dependent on any particular generic conversation data structure 302, such that the decoupled methods can be used in multiple services and multiple instances of generic conversation data structures 302. Thus, the architecture of service establishment system 300 permits easy integration, easy establishment, and easy re-use of its components. In this manner, enterprises can now more easily collaborate with one another and can more easily establish, initiate, maintain, and support a variety of services.

Figure 4:
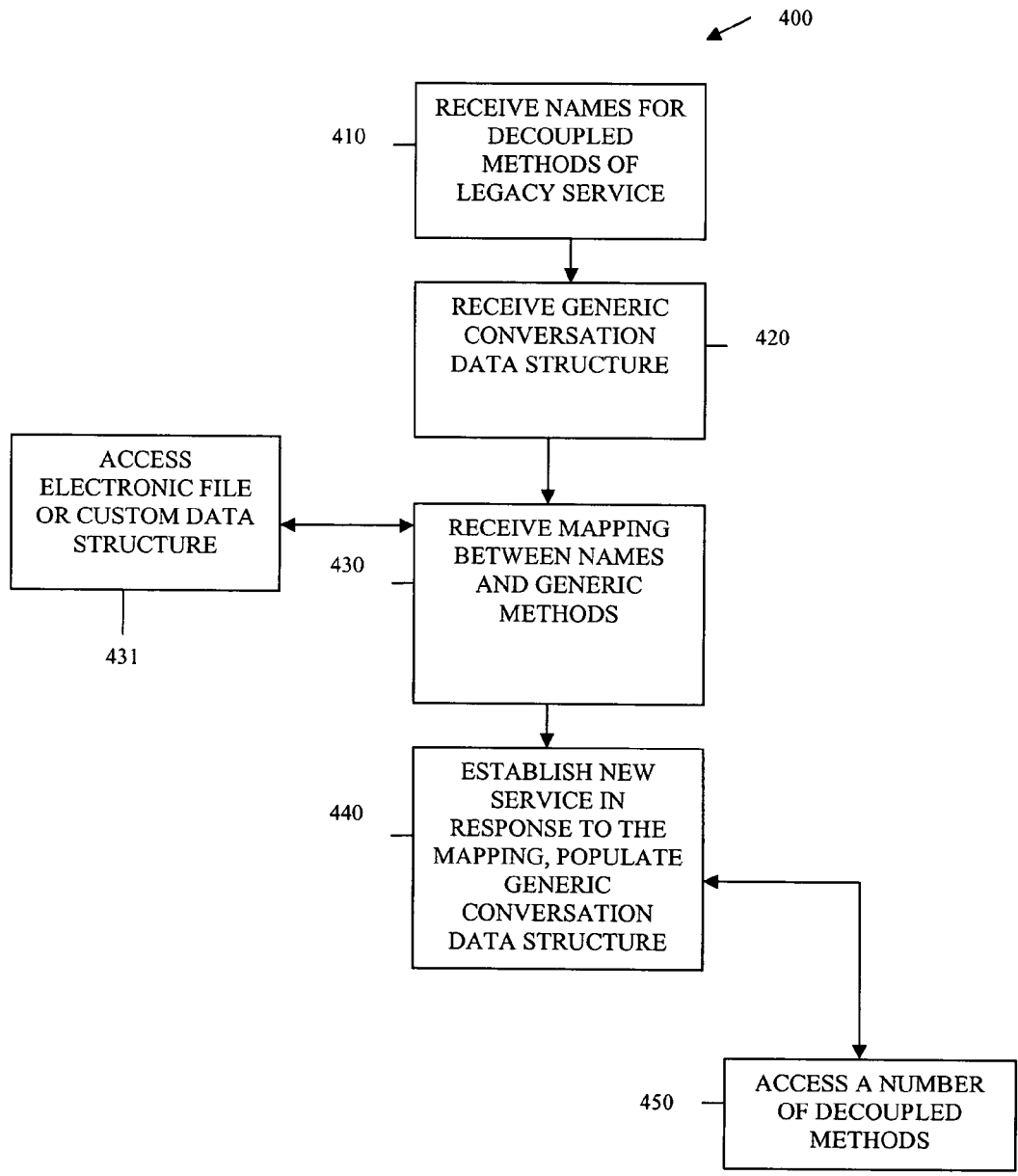
FIG. 4 is a diagram associated with the processing of instructions for establishing services, according to an embodiment of the invention.

FIG. 4 illustrates another diagram for instructions that establish a service. Those instructions reside and are implemented in one or more machine-accessible and readable media. The instructions when loaded and processed on a processing device perform the method 400 depicted in FIG. 4. The instructions can reside in volatile and/or non volatile storage media. In some embodiments, the instructions reside on removable media and are subsequently interfaced, loaded, and initiated on a processing device. In other embodiments, the instructions are downloaded from a remote server over a network and loaded and executed on a processing device. In yet more embodiments, the instructions are remotely loaded and processed on a remote processing device over a network.

Initially, at 410, the instructions receive names of decoupled methods. In some embodiments, these names are references to memory locations associated with executing decoupled methods that were originally associated with a legacy service and one or more of its legacy applications. In other embodiments, the names are associated with newly created operations that were not associated with any particular previous legacy service.

At 420, the instructions receive a generic conversation data structure. That generic conversation data structure is similar to the generic service data structure 200 of FIG. 2 and the generic conversation data structure 300 of FIG. 3. The generic conversation data structure includes names of generic methods and includes executable logic for defining the invocation and processing flow of those generic methods when processing.

At 430, the instructions receive a mapping between the specific names of the decoupled methods and the generic methods of the generic conversation data structure. Again, the mapping is similar to what was described above with respect to method 100, data structure 200, and system 300 of FIGS. 1-3, respectively. Thus, in some embodiments, at 431, the mapping may be acquired from an electronic file or another custom data structure.

Once the names of the decoupled methods, the generic conversation data structure, and the mapping are received, a new specific instance of a service is established at 440 by enforcing the mapping against the generic conversation data structure. Accordingly, at 440, the generic conversation data structure is populated with the names of the decoupled methods in accordance with the mapping.

The result is a new instance of a service, which when interacted with will access a number of the decoupled methods at 450 to perform a variety of operations defined in generic conversation data structure and directed by interactions occurring with a contacting party. A contacting party can be a user, client, other service, or application. Contact may be made directly to the new service or indirectly via another application, such as a WWW browser over the Internet.

In some embodiments, the instructions are capable of receiving the generic conversation data structure as output from a conversation editor. In a like manner, the instructions are capable of receiving the mapping as output from a mapping editor. Additionally, in some embodiments, the instructions enforce the mapping automatically or the instructions interface with yet another application that enforces the received mapping in order to properly populate the generic conversation data structure with the specific names of the decoupled methods.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

The invention claimed is:

1. A method of establishing a service, the method comprising:

executing instructions on a processor to identify first methods associated with a legacy service;

executing instructions on the processor to match at least one of the first methods to at least one generic method of a conversation, the generic method having an identifier for identifying the generic method for invocation by a program of a specific instance of the conversation;

executing instructions on the processor to establish a new service as the conversation that includes the at least one of the first methods by matching said at least one of the first methods with said at least one generic method;

decoupling legacy operations of the legacy service to create said at least one of the first methods; and populating a data structure with names associated with the at least one of the first methods that replace the at least one of the first methods in the conversation in an order that permits each generic variable name for one of the first methods to be replaced by one of said at least one generic method.

2. The method of claim 1, further comprising publishing the at least one generic method as being available for use in one or more additional conversations.

3. The method of claim 1, further comprising populating a data structure which lists generic variable names for the at least one generic method along with names associated with the at least one of the first methods that are to replace them in the conversation.

4. The method of claim 1, further comprising manually modifying the conversation in order to replace the at least one of the first methods in the conversation with the at least one generic method.

5. The method of claim 1, further comprising processing the new service on a World-Wide Web server available to clients, users, other services, and applications over the Internet.

6. A method comprising:

executing instructions on a processor to identify methods associated with a legacy service;

executing instructions on the processor to decouple methods associated with the legacy service, the legacy service being coupled to the decoupled methods prior to the decoupling;

executing instructions on the processor to match at least one of the decoupled methods to at least one generic method of a conversation, the generic method having an identifier for identifying the generic method for invocation by a program of a specific instance of the conversation; and executing instructions on the processor to establish a new service as the conversation that includes the at least one of the decoupled methods by matching said at least one of the decoupled methods with said at least one generic method;

decouple legacy operations of the legacy service to create said at least one of the decoupled methods; and populate a data structure with names associated with the at least one of the decoupled methods that replace the at least one of the decoupled methods in the conversation in an order that permits each generic variable name for the one of the decoupled methods to be replaced by one of said at least one generic method.

7. The method of claim 6, further comprising initially establishing a conversation data structure containing the at least one generic method by way of a conversation editor.

8. The method of claim 7, wherein the conversation data structure includes instruction logic which defines the processing flow of the new service.

9. An article comprising a non-transitory computer readable storage medium to store instructions that when executed by a computer cause the computer to:

identify first methods associated with a legacy service;

match at least one of the first methods to at least one generic method of a conversation, the generic method not being associated with any specific instance of a method; and establish a new service as the conversation that includes the at least one of the first methods by matching said at least one of the first methods with said at least one generic method;

decouple legacy operations of the legacy service to create said at least one of the first methods; and populate a data structure with names associated with the at least one of the first methods that replace the at least one of the first methods in the conversation in an order that permits each generic variable name for one of the first methods to be replaced by one of said at least one generic method.

10. The article of claim 9 the storage medium storing instructions that when executed by the computer cause the computer to publish the at least one generic method as being available for use in one or more additional conversations.

* * * * *

UNITED STATES PATENT AND TRADEMARK OFFICE
CERTIFICATE OF CORRECTION

PATENT NO. : 8,799,901 B2
APPLICATION NO. : 10/850131
DATED : August 5, 2014
INVENTOR(S) : Harumi Kuno et al.

Page 1 of 1

It is certified that error appears in the above-identified patent and that said Letters Patent is hereby corrected as shown below:

In the Specification

In column 2, line 60, after "embodiment," insert -- at 123, the generic method names can be manually edited or edited in an automated fashion via manual interactions. In this embodiment, --.

In the Claims

In column 8, lines 3-4, in Claim 6, delete "conversation; and" and insert -- conversation; --, therefor.

In column 8, line 30, in Claim 9, after "method;" delete "and".

Signed and Sealed this
Twenty-fifth Day of November, 2014

Michelle K. Lee
*Deputy Director of the United States Patent and Trademark Office*